Oct. 20, 1925.                                            1,557,602
                        J. F. MONNOT
                  ELECTRIC STORAGE BATTERY
                  Filed Feb. 14, 1924         2 Sheets-Sheet 1
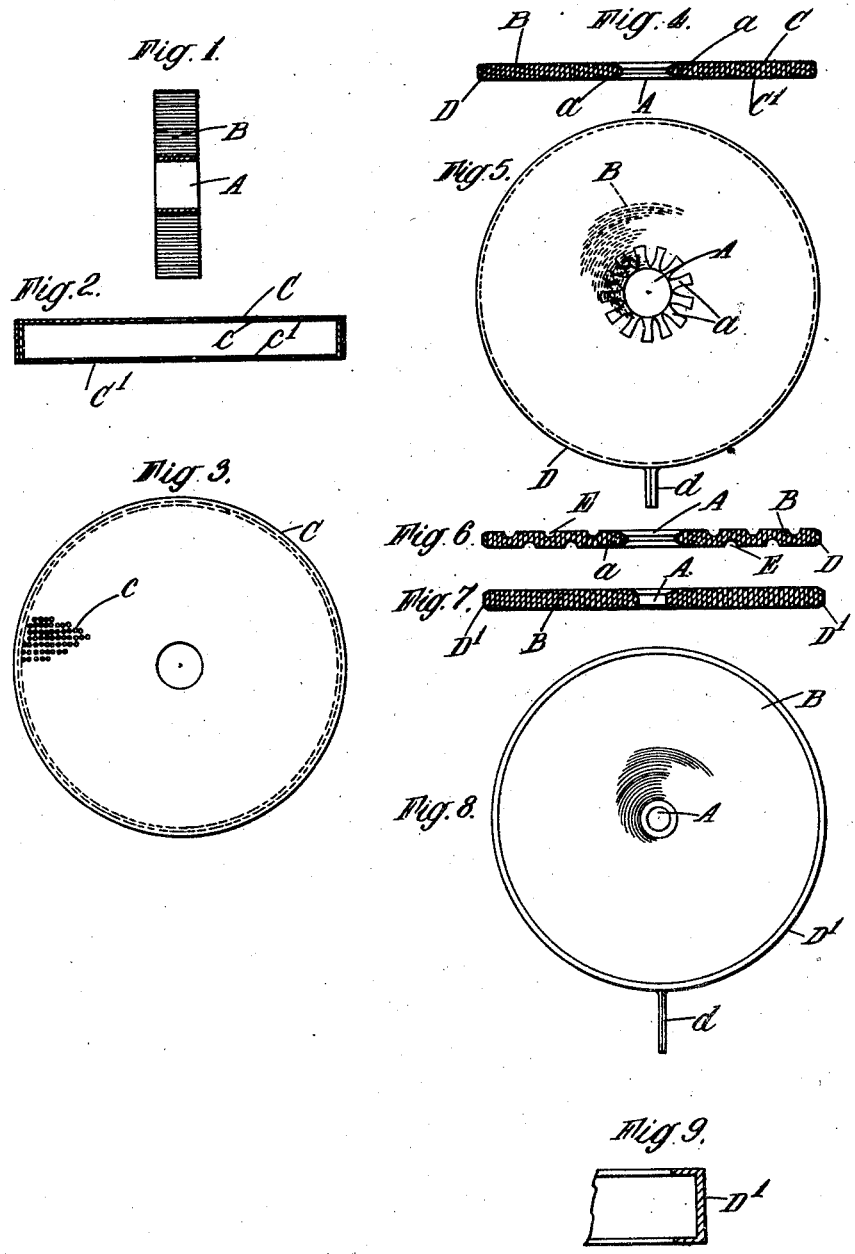

Oct. 20, 1925.
J. F. MONNOT
1,557,602
ELECTRIC STORAGE BATTERY
Filed Feb. 14, 1924
2 Sheets-Sheet 2
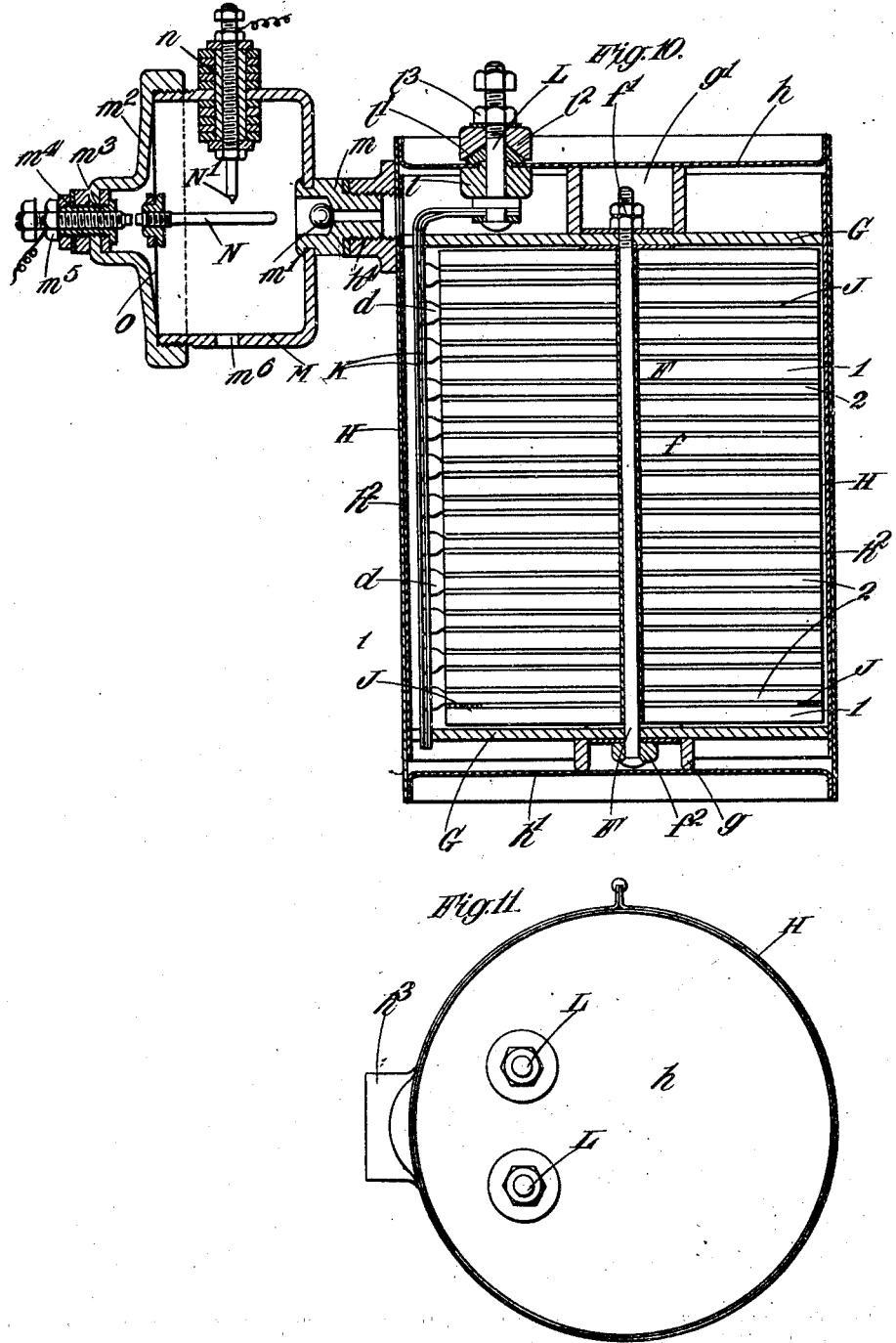

Patented Oct. 20, 1925.

1,557,602

UNITED STATES PATENT OFFICE.

JOHN FERREOL MONNOT, OF MILL HILL, ENGLAND.

ELECTRIC STORAGE BATTERY.

Application filed February 14, 1924. Serial No. 692,725.

*To all whom it may concern:*

Be it known that I, JOHN FERREOL MONNOT, a citizen of the United States of America, residing at Highwood House, Mill Hill, in the county of Middlesex, England, have invented certain new and useful Improvements in Electric Storage Batteries, of which the following is a specification.

This invention relates to electric storage or secondary batteries, more particularly batteries employing nickel paste as the active material. One object of the invention is to provide plates of great strength and low resistance which are readily permeable by the electrolyte. Another object is to enable the cell to be completely sealed so as to avoid entry of air and to provide for the removal of surplus gases generated in the cell. A further object is to provide a very compact form of cell in which the plates are firmly built into a block providing for proper access of the electrolyte to all the plates.

The storage battery electrode comprises a plate built up of thin metal ribbon closely wound or folded, with active material between the layers of the ribbon. The electrode is prepared by coating a very thin perforated metal ribbon, preferably of nickel, with a thin layer of active material in the form of paste, the coated ribbon being then wound upon a small tube until a substantial diameter is reached, whereupon the coiled disc or ring is subjected to heavy pressure so as to form a solid mass with reduction in thickness of the disc.

The rigid disc electrodes resulting from the above treatment can be mounted on an insulating rod passed through the central aperture and insulating washers or layers of asbestos cloth may be placed between the electrodes, connected up so as to form alternate positive and negative electrodes, the complete group being inserted in a steel cylinder closed at both ends by welded steel discs with suitable apertures for passing the positive and negative leads.

In nickel secondary batteries the electrolyte is usually a solution of caustic potash and if this is exposed to the air the electrolyte has to be frequently renewed. Also in charging the cells a considerable proportion of the water is decomposed into oxygen and hydrogen and the addition of water is usually required to keep the electrolyte at its proper concentration and volume. These disadvantages may be avoided by fitting to a sealed cell container a small vessel or chamber communicating with the cell through a passage adapted to be closed against a return of the gases to the cell and provided with an electrical ignition device by which the mixture of hydrogen and oxygen may be ignited so as to recombine into water.

In order that the said invention may be clearly understood and readily carried into effect, the same will now be described more fully with reference to the accompanying drawings, in which:—

Figure 1 shows in section the electrode as a thick perforated disc formed by winding the coated ribbon around a central tube or ring.

Figures 2 and 3 show, respectively in section and plan, a perforated casing in which the wound disc can be placed prior to compression.

Figures 4 and 5 are, respectively, a section and a plan of an electrode in its finished form.

Figure 6 is a section of an electrode in which the surface is increased by the formation of depressions or corrugations.

Figures 7 and 8 show in section and plan a modified construction of electrode.

Figure 9 is a detail view showing a section through the edge of an encircling band employed with this modified electrode.

Figures 10 and 11 are, respectively, a section and an end view of a built up cell formed by a number of electrodes made in accordance with the present invention.

Referring to the electrode illustrated in Figures 1 to 6, A is the central ring or tube around which the coated ribbon B is wound. C, $C^1$ are the top and bottom members of a case in which the electrode is put prior to pressing, the top and bottom faces $c$, $c^1$ of the case being provided with a large number of small perforations extending over the entire surface. D is an outer ring placed around the periphery of the completed electrode and formed from a metal strip provided with tongues $d$ at the ends, which are welded together to form the complete ring and project from the edge for connecting to the leads in the assembled cell.

In preparing the electrode thin nickel foil, finely perforated, is made up in the form of a ribbon on which the active material is spread as a thick paste, for example, nickel hydroxide for the positive plate and cadmium hydroxide for the negative plate. The coated ribbon made is of a width depending upon the size of the electrode required and may, for example, have a width of about a quarter of an inch. This ribbon is wound around the central tube or ring A, of a diameter say about a quarter of an inch, until a disc of the required diameter, say from one inch upwards, is obtained. The coiled disc before it is subjected to pressure is dried in a suitable oven and as it has been found that the active material in such a form of electrode sometimes has a tendency to be squeezed out between the layers of ribbon the disc may be placed in the case C, $C^1$, comprising two nickel plated steel covers finely perforated as indicated. The conducting band or ring D is placed around the case, which it fits closely, and the complete device is placed in a press and subjected to a pressure of about five tons per square inch. The central ring A, which may be suitably notched, is spread out in the press at the two sides of the disc in the form of radiating tongues $a$, shown especially in Figure 5, and the side walls of the cover C, $C^1$ are crushed together to form a substantial rim and to bind firmly against the outer band or ring D. The completed electrode is then in the form of a rigid disc having a central perforation provided by the ring A and body formed by finely perforated metal enclosing the active material, in the form of the crushed pasted ribbon. The electrode may be in plain disc form or, if desired, the press may provide the faces with annular or other corrugations E (Figure 6) to increase the surface and permit the electrolyte to penetrate more readily. The positive and negative plates are made in the same manner, but of different thicknesses.

The thickness of the active material coated on the perforated foil is preferably about ½ mm., and the perforated covers forming the case of the electrode may be made of thin sheet about 0.005″ thick, stamped out in the shape of a cup. The case may however be dispensed with and as any expansion that may take place in use is lateral and, owing to the coil formation, not in the thickness of the disc, the steel band surrounding the disc prevents swelling.

To avoid risk of the paste being squeezed out a special form of ribbon may be employed entirely enclosing the active material except for the perforations which allow the electrolyte to penetrate. For this purpose the nickel foil strip may be made wider and its edges turned up to receive a layer of the active material, upon which a narrower metal strip is placed, the turned up edges being then turned down to seal the active material between the two strips. The ribbon so made can, if of sufficient width, be folded longitudinally by suitable rollers into several thicknesses according to the width of the ribbon and then coiled around the central tube until the required diameter is obtained.

A convenient method of applying the paste is to make it up in the form of a thick syrup and run it from a container continuously on to the ribbon, the edges of which have been turned up, and to pass the coated ribbon continuously through a heating channel supplied with hot air to evaporate the moisture until the material becomes pasty, the ribbon being then, with or without the covering layer, wound into the plate form.

The syrupy coating may be produced by mixing the active material with about 50 per cent of water and 5 per cent of sugar syrup. The coiled disc is placed within an outer ring or band $D^1$ of channeled section, as indicated in Figure 9, without the enclosing case C, $C^1$ of the first construction and is then pressed to flatten and expand into the channeled band, the complete electrode having the form shown in Figures 7 and 8.

The arrangement of a cell built up from an assembly of electrodes in accordance with this invention is shown in Figures 10 and 11, the thicker electrodes 1 being positive and the thinner ones 2 being negative. These electrodes are mounted on a nickel plated steel rod F over which is placed an ebonite sheath $f$ fitting closely in the hole formed in the centre of the electrodes by the ring A on which the electrode ribbons are wound. Two supporting end plates G also of ebonite are mounted at each end of the cell on the central bolt or rod F, the end of which is screw threaded and receives the clamping nuts $f^1$. H is the casing of the cell hermetically closed by the end plates $h$, $h^1$ and the electrodes 1, 2 are separated by layers J of ebonite or like insulating material or, preferably, of pure asbestos cloth of loose mesh and of the same diameter as the electrode. The asbestos resists the alkaline solution and allows of a rigid assembly of the plates, leaving only a small distance between them. The layers are very porous and permit of ready access of the electrolyte to the plates, reducing the volume of electrolyte necessary.

In assembling the electrodes to constitute the cell the centering end disc G is placed on the bolt F and the ebonite tube $f$ placed in position around the tube, whereupon the first positive plate 1 is threaded on the sheath and bolt. The asbestos cloth separator is then placed over the plate and the negative plate 2 threaded on the bolt, successive positive and negative plates being similarly threaded with asbestos separators between each pair until the number of plates required is obtained. The second centering end plate G is then threaded on the bolt and the whole assembly clamped tightly together by the nuts $f^1$. The ends or tongues $d$ of the conducting bands D, $D^1$ shown in the previous figures are electrically welded to the two pairs of conducting strips, K of nickel plated steel, one pair serving for the positive plates and the other for the negative plates, these two pairs of conducting strips being connected to the terminals L of the cell, which terminals are mounted on the end plate $h$ of the cell. The electrodes so assembled are inserted in the cylindrical casing H, which has already had the end cover $h^1$ welded to it, the cylinder being lined inside with a thin sheet $h^2$ of pure ebonite. A short length of ebonite tube $g$ fitted around the washer placed under the head $f^2$ of the bolt or rod F abuts against the cover or end plate $h^1$ of the casing and a second tube $g^1$ is placed on the ebonite plate G at the other end of the cell, lying between it and the casing cover $h$. The casing cover $h$, with suitable holes through which the terminals L can pass, is then placed in position in the container and welded to the edge of the latter. The electrolyte is supplied through a suitable filling cap $h^3$. The cell is sealed and owing to its cylindrical form is adapted to withstand substantial internal pressure and it is advantageous to work at a pressure of, say, 10 lbs. per square inch, in which case the filling cap may carry a small safety valve adapted to allow of escape of gas above any pressure which is determined as the maximum desirable. The entry of air is prevented so that carbonization of the electrolyte is avoided. To insulate the terminals L from the container and to make a tight joint a thick washer $l$ of ebonite is fitted on the terminal and when the cover $h^1$ is welded a washer $l^1$ of soft rubber is placed on the terminal and covered by a third grooved washer $l^2$, the washers being tightened up by the nut $l^3$ which compresses the soft rubber washer $l^1$ so as to fill up the space between the hole in the cover and the terminal and to make a tight joint well insulated from the container.

Referring to the ignition arrangement, M is the ignition chamber mounted on the tubular stem $m$, which is screwed into a nipple $h^4$ on the casing H, a small ball valve $m^1$ being placed at the top of the passage through the stem $m$, allowing the passage of gases from the cell into the chamber M, but preventing their return. N, $N^1$ are sparking electrodes, one of which is fitted in the insulating sheath $n$ passing through the side of the chamber M, while the other is mounted on the diaphragm O which extends across the upper or outer end of the chamber M within the cover $m^2$, which is screwed upon the chamber and carries an adjustable contact $m^3$ screwing through the sleeve $m^4$, mounted in an insulated manner in the cover $m^2$, and held in adjusted position by the nuts $m^5$. The upper end of the sparking electrode N is closely adjacent to the lower end of the contact $m^3$ and when the pressure in the chamber M rises to a predetermined level the diaphragm O is pressed back sufficiently to bring the members N and $m^3$ into contact, closing the firing circuit, whereupon ignition is effected by sparking across the gap between the electrodes N, $N^1$. A small safety valve may be provided and a tapped hole $m^6$ is shown to receive the safety valve.

What I claim and desire to secure by Letters Patent of the United States is:—

1. A method of making a storage battery electrode which consists in coating a thin metal ribbon with a layer of active material, closely winding or folding the ribbon upon itself until a plate is formed with the ribbon extending from front to back and subjecting the plate and ribbon to heavy pressure so as to form it into a solid mass.

2. A storage battery electrode comprising a thin metal ribbon with a layer of active material closely wound upon itself to form a plate which is subjected to lateral pressure to consolidate the material into a solid mass, the metal ribbon extending through the thickness of the plate and a thin perforated metal case within which the ribbon plate is enclosed.

3. A method of making a storage battery electrode which consists in coating a thin metal ribbon with active material, closely winding the said ribbon into the form of a disc, inserting the said disc in a thin perforated metal case and subjecting the case and the ribbon disc to high pressure to form a solid disc-like plate.

4. A storage battery electrode comprising a plate built up of thin metal ribbon coated with active material and closely wound into the form of a disc, and an encircling metal ring, the disc of wound coated ribbon being subjected to heavy compression which expands the disc tightly into the encircling metal ring which forms the enclosing ring of the complete plate.

5. In an electrode as in claim 4, means solid with the said ring for attachment of the electrode to a lead of the storage cell.

6. A method of making a storage battery electrode which consists in applying a paste of active material, made into the form of a thick syrup, to a thin metal ribbon by running the syrup continuously on to the surface of the ribbon, passing the coated ribbon continuously through a heating channel to evaporate part of the mixture from the paste and winding the said ribbon, after partial drying, into the form of a plate.

7. A storage cell comprising a series of rigid electrode plates each built up of thin metal ribbon coated with active material and wound upon a central tube, an insulating rod passing through the central tubes of the said plates, insulating layers between the said plates, means for binding the block of plates upon the rod and a container for the block of plates.

JOHN FERREOL MONNOT.